(12) United States Patent
Wang (10) Patent No.: US 6,477,612 B1
(45) Date of Patent: Nov. 5, 2002

(54) PROVIDING ACCESS TO PHYSICAL MEMORY ALLOCATED TO A PROCESS BY SELECTIVELY MAPPING PAGES OF THE PHYSICAL MEMORY WITH VIRTUAL MEMORY ALLOCATED TO THE PROCESS

(75) Inventor: Landy Wang, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/499,918

(22) Filed: Feb. 8, 2000

(51) Int. Cl.[7] .............................................. G06F 12/00
(52) U.S. Cl. ........................................ 711/2; 711/206
(58) Field of Search ...................................... 711/2, 206

(56) References Cited

PUBLICATIONS

The Waite Group's MS–DOS Papers for MS–DOS Developers and Power Users, 1988, pp. 535–562.*

\* cited by examiner

*Primary Examiner*—David L. Robertson
(74) *Attorney, Agent, or Firm*—Law Offices of Albert S. Michalik, PLLC (57) ABSTRACT

A system and method for providing applications with the ability to access an increased amount of memory. An application maps a specified address range in its (small) virtual memory space to a corresponding number of pages allocated thereto in (relatively large) physical memory. When the application accesses an address in that range in virtual memory, e.g., via a thirty-two-bit address, the mapping information is used to access the corresponding page currently pointed to in the physical memory, allowing access to significantly greater amounts of memory. Fine granularity of access (e.g., one page) is provided, along with fast remapping, cross-process security and coherency across multiple processors in a multiprocessor system. To this end, a memory manager maintains information related to the mapping of virtual addresses to physical pages, in order to verify remap requests and invalidate existing mappings from a virtual address to a previously mapped physical page. For coherency in a multi-processor system, a list is maintained for invalidating existing mappings in the translation buffers of other processors in a consolidated operation, thereby requiring only a single interrupt of each processor to invalidate mappings.

52 Claims, 8 Drawing Sheets

PROVIDING ACCESS TO PHYSICAL MEMORY ALLOCATED TO A PROCESS BY SELECTIVELY MAPPING PAGES OF THE PHYSICAL MEMORY WITH VIRTUAL MEMORY ALLOCATED TO THE PROCESS

FIELD OF THE INVENTION

The invention relates generally to computer systems, and more particularly to managing computer system memory.

BACKGROUND OF THE INVENTION

In contemporary operating systems such as Microsoft Corporation's Windows® 2000 operating system, applications are provided with thirty-two bit virtual addressing, which allows up to four gigabytes to be addressed even if the system has less than four gigabytes of physical memory. The operating system reserves two gigabytes of virtual memory for itself, although in one recent improvement, the operating system can be configured to use only one gigabyte of virtual memory. This leaves applications with two gigabytes (or in some cases three gigabytes) of directly addressable memory. While at one time this matched the maximum amount of memory that a processor could physically address, contemporary thirty-two-bit processors are now able to physically address up to sixty-four gigabytes of memory.

While four gigabytes is suitable for many applications, some applications need to be able to access huge amounts of data at a high speed. For example, a large database may contain many gigabytes of records that a database application may need to access. Disk swapping in and out with a two-gigabyte or three-gigabyte cache works, but is very slow and thus undesirable. Using the full amount of available (e.g., up to sixty-four gigabytes) random access memory (RAM) for the database data is far faster and thus desirable.

Using memory segmenting (in a similar manner to segmenting in 286 processors and below) is not an adequate solution for addressing increased amounts of memory, because such segmenting would be directed to relatively large segments of memory, having a size that is based on the total size available divided by the addressable space. For example, 640-kilobytes of memory provided ten 64-kilobyte segments. Such a coarse granularity is not very effective in many applications, including data caching operations.

One solution to utilizing larger amounts of RAM is referred to as the PSE-36 method. With this method, however, applications need to be rewritten and/or the memory partitioned into ramdisks (sections of memory that appear to be disk drives but are actually in RAM) to obtain a performance benefit, which is not always apparent. Moreover, PSE-36 operates by copying frames of information into thirty-two-bit application addressable space so that the application can access the information, and any copying operation costs processor, cache, bus and memory cycles.

SUMMARY OF THE INVENTION

Briefly, the present invention provides a method and system for enabling applications to access an increased amount of physical memory via an extension to virtual memory addressing. APIs are provided in a memory management component of an operating system, to enable an application to request allocation of special amounts of virtual memory that are capable of being remapped to pages of physical memory, to request allocation of physical memory, and to control the mapping therebetween. The mapping may be to a fine granularity, as little as a single page in virtual memory mapped to a single page in physical memory. An API is also provided to free physical memory. The memory manager records the mappings in a table, which are then used in a processor's translation buffer to point a given virtual address to a mapped-to page of physical memory.

The memory manager includes a number of mechanisms to ensure that fast mapping (and remapping), cross-process security and coherency across multiple processors in a multiprocessor system is provided. One such mechanism includes a special per-process linked list which (at present) contains only window-supporting views. When remap-capable virtual memory is allocated to a process, the memory manager adds an entry for it to the linked list. Upon a remap request, the linked list is evaluated by the memory manager to rapidly verify that the requesting process has specified a range of virtual memory that is capable of being mapped. Another mechanism comprises a bitmap representing the physical pages that are currently allocated to a process, which is maintained and used by the memory manager to rapidly determine whether a physical page (to which the process has requested to map a virtual address) is currently allocated to that process. This provides the security, in that one process cannot access data belonging to another process or the system itself. Additionally, by using the bitmap index as an index into the system-wide page frame number database the memory manager can rapidly determine whether the requested physical page is already mapped, which is not allowed. Lastly, the memory manager checks to determine whether a virtual address for which a mapping operation is being requested is already mapped to another physical page, and if so, the memory manager invalidates the existing mapping before remapping the virtual address to the new page. The invalidation includes invalidating (e.g., removing) mapping information from the processor's translation buffer. In a multiprocessor system, the invalidation is performed as needed across multiple processors, thereby ensuring data coherency. For improved performance, the invalidation of multiple mappings is typically performed in a single batched operation on each processor, whereby each processor only needs to be interrupted once to perform the invalidations.

When the mappings are present and an application accesses an address in a mapped range in virtual memory, (e.g., via a thirty-two bit address), the processor uses the mapping information in its translation buffer (obtained via the memory manager) to access the corresponding page pointed to in the physical memory. The requested byte on the mapped-to page is accessed according to the byte index of the virtual memory address. The process can rapidly remap virtual memory addresses to other physical pages allocated to that process, thereby enabling access to larger amounts of memory via a virtual address, essentially by adjusting a pointer in a straightforward manner, and without copying of the data.

Other advantages will become apparent from the following detailed description when taken in conjunction with the drawings, in which:

DETAILED DESCRIPTION OF THE PREFERRED EMBODIMENT

Exemplary Operating Environment

Figure 1:
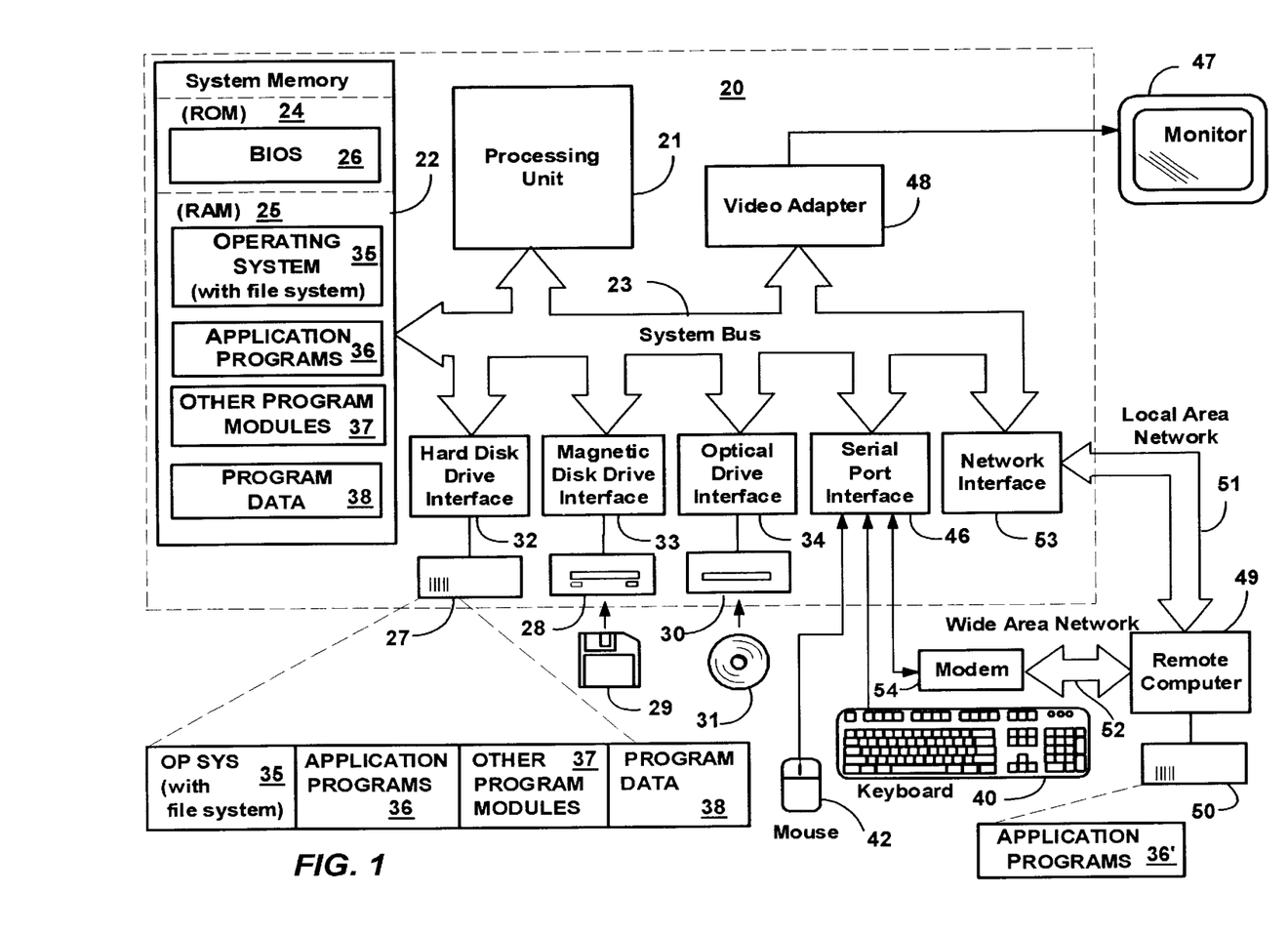
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types.

Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows® 2000), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Note that the present invention is described herein with respect to the Windows® 2000 (formerly Windows® NT®) operating system. However, as can be readily appreciated, the present invention is not limited to any particular operating system, but rather may be used with any operating system, and moreover, has many uses in general computing.

Extending Addressable Space

Figure 2:
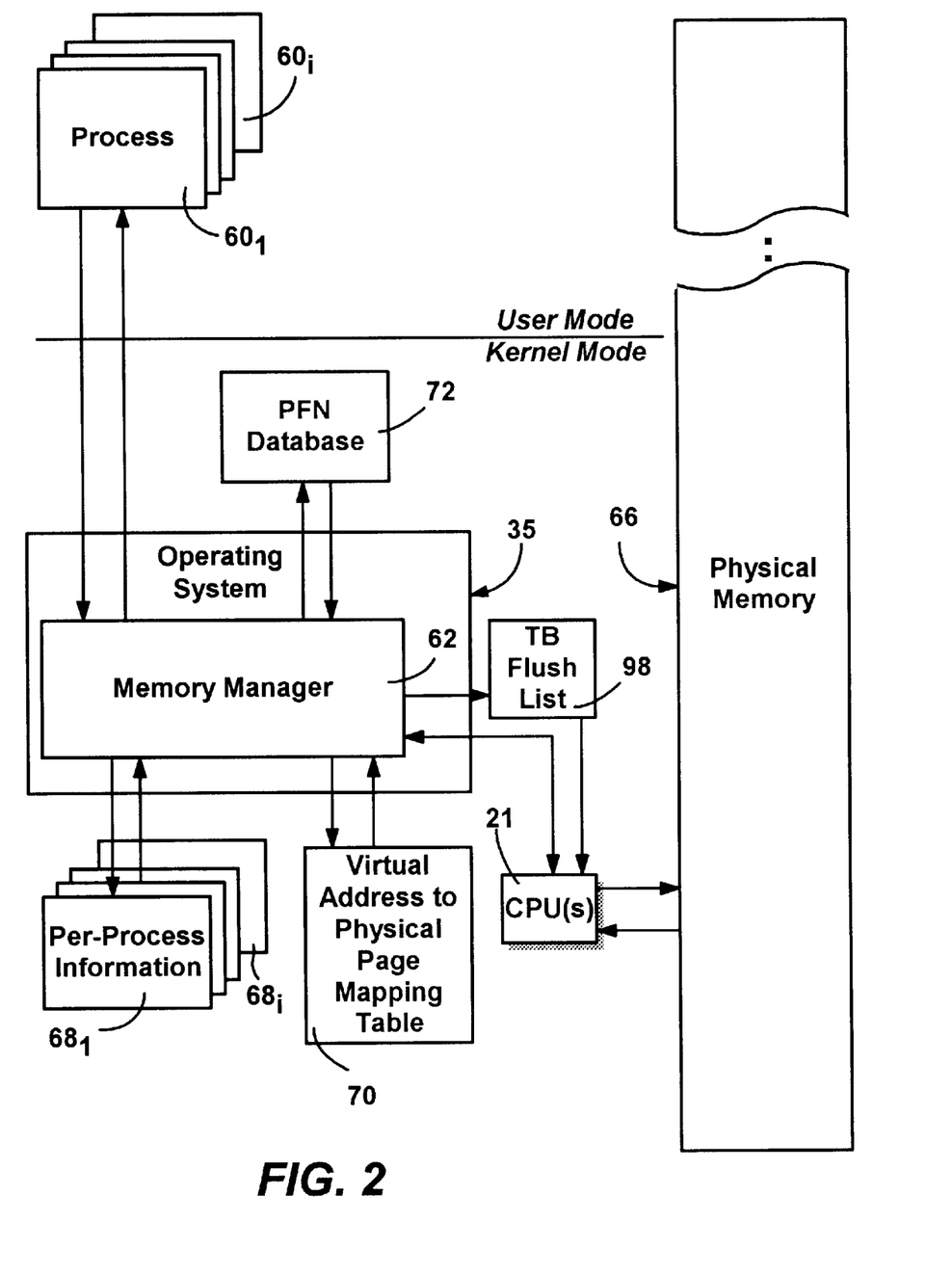
FIG. 2 is a block diagram generally representing a general architecture for managing memory in accordance with an aspect of the present invention.

Turning to FIG. 2 of the drawings, there is shown a general architecture into which the present invention may be incorporated. Each process of a set of processes $60^1$–$60^i$ communicates with the operating system 35, which includes a memory manager 62 for handling the memory requirements of the processes $60^1$–$60^i$, kernel-level components such as drivers, and the operating system 35 itself. In the Windows® 2000 (formerly Windows NT®) operating system, one task of the memory manager 62 is to manage virtual memory, which has heretofore given application processes (e.g., $60^1$–$60^i$) the ability to address more random access memory (e.g., two gigabytes) than is actually physically available in a given system (e.g., 32 megabytes). The memory manager 62 in Windows® 2000 accomplishes this through a combination of address translation techniques and disk swapping techniques, as generally described in the references entitled *Inside Windows NT®*, H. Custer, Microsoft Press (1993), and Inside Windows NT®, Second Edition, D. Solomon, Microsoft Press (1998), herein incorporated by reference. Note, however, that the present invention as described herein is generally directed to systems having more physical memory than addressable virtual memory.

To manage virtual and physical memory, the memory manager 62 maintains memory-related information $68^1$–$68^i$ for each process, including for example, which virtual memory locations are allocated thereto. The memory manager 62 also maintains a set of tables (including a special virtual address-to-physical page mapping table 70 used in the present invention and described below) that are used by the CPU 21 to translate virtual memory addresses to actual physical memory addresses. More than one such table may be used. Note that the various components shown in FIG. 2 (other than the CPU 21) are often present within the physical memory 66, but for purposes of clarity are not shown as loaded therein.

In physical memory in the Windows® 2000 environment, user-accessible memory is organized in units referred to as a page, wherein, for example, a page equals four kilobytes (4096 bytes in decimal) in an "x86" microprocessor-based system. Other page sizes (e.g., eight kilobytes in an Alpha microprocessor-based system) may be employed. Indeed, there is no intention to limit the present invention to any particular microprocessor, page size and/or memory architecture, as it is expected that as microprocessors evolve into other page sizes and/or larger amounts of physical memory, such systems will also benefit from the present invention. Indeed, the present invention successfully operates on different Windows® 2000 platforms using varying page sizes and virtual address sizes. Thus, as used herein, a "page" is not limited to any particular size, and may even be variable within a given system. A PFN (page frame number) database 72 is used by the memory manager 62 to track the physical pages in memory, including the relationships to virtual page addresses and other state information about the physical pages, as also described below.

In accordance with one aspect of the present invention, each process (e.g., $60_1$) can request via an application programming interface (API) 74 or the like (FIG. 4) that the memory manager 62 allocate virtual memory thereto that is capable of being mapped to physical pages of memory above the four-gigabyte (thirty-two bit) addressing limit. Note that as described below, as little as one page may be mapped, which is highly beneficial to applications that want to cache data with a relatively fine granularity. It should be noted, however, that the present invention is not limited to applications and/or their processes/threads, as other processes including those of objects, processes incorporated into the operating system itself, and so forth may benefit from the present invention. Thus, although APIs are described herein, the present invention may operate via any number of techniques that allow interprocess communication.

Figure 3:
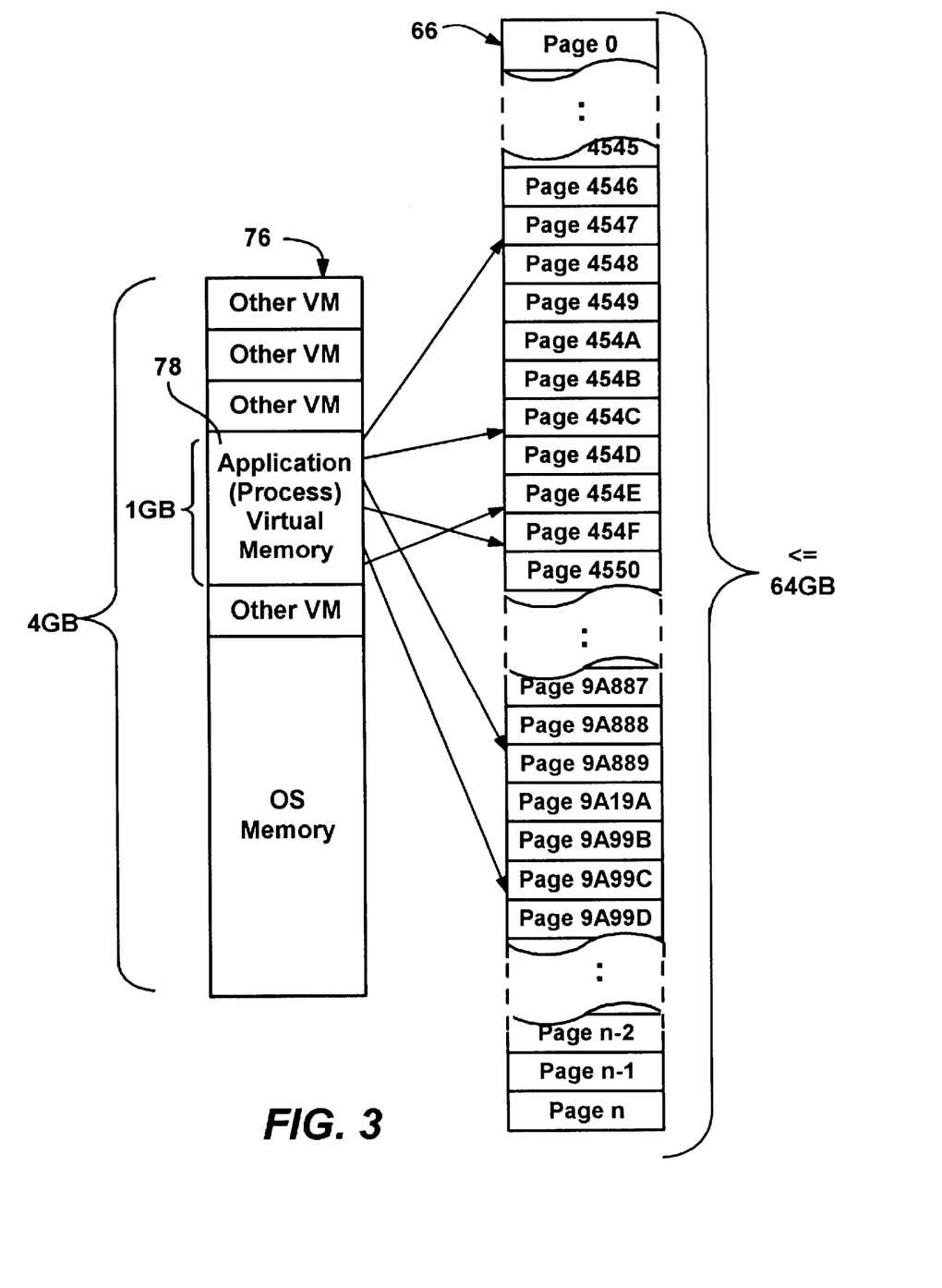
FIG. 3 is a block diagram generally representing the mapping from a smaller region of virtual address space to a larger amount of physical space in accordance with an aspect of the present invention.
Figure 4:
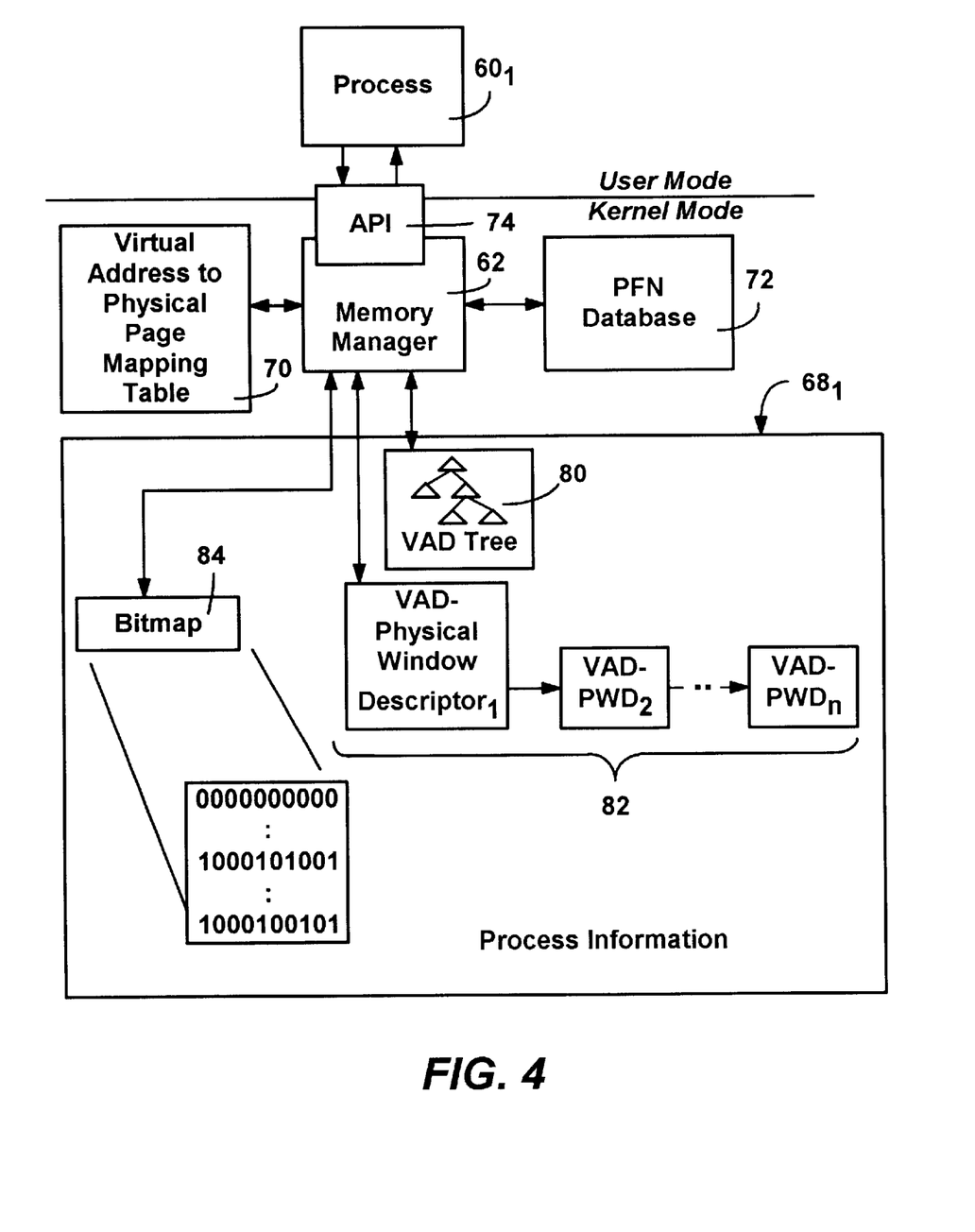
FIG. 4 is a block diagram generally representing information maintained by a memory manager in association with each process for rapidly and securely extending memory access capabilities of a process in accordance with an aspect of the present invention.

To request the allocation of a region of virtual memory 76, (e.g., the region 78 in FIG. 3), as generally represented in FIGS. 3 and 4, a process $60^1$ makes an API function call to the memory manager 62. Via other APIs (described below) the process $60^1$ also requests the allocation of pages of physical memory 66, and then requests the mapping and remapping of addresses in virtual memory in one or more of the specially-allocated regions to the pages of the physical memory 66. Essentially, each mapping represents a pointer from a virtual address to a page in the physical memory 66. Note that although virtual memory 76 is not a tangible structure, it can be considered such from the viewpoint of the components (such as processes and the operating system) that access it, and is thus shown as a logically-organized structure in FIG. 3.

To allocate a special section of virtual memory (e.g., the section 78), an API is called, i.e., the VirtualAlloc function, with certain flags set. In keeping with the present invention, this function reserves the specified special region 78 of virtual memory 76 within the virtual address space of a specified process that can then be used to map physical pages into and out of view, as specified by the process. More particularly, in the API function call, the MEM—PHYSICAL flag is set in the AllocationType parameter, as well as MEM—RESERVE. In the present implementation, MEM—COMMIT is NOT set and the page protection is set to PAGE—READWRITE.

A FreeVirtualMemory function can be used on the specially-allocated region 78 of virtual memory 76, which will invalidate any physical page mappings associated with the virtual region when freeing the address space. However, the physical pages themselves are not deleted, and can be subsequently used by the application/process. To delete the physical pages, the application/process needs to explicitly call FreeUserPhysicalPages. Also, note that on process termination, these resources are automatically cleaned up.

As shown in FIG. 4, the memory manager 62 maintains information (e.g., $68^1$) on each process (e.g., $60^1$), including information on the virtual memory regions allocated thereto. More particularly, a virtual address descriptor (VAD) is organized as a binary tree, and this VAD tree 80 tracks the virtual memory locations allocated to the process $60^1$, with each node describing some range of virtual memory and some state information about that range, e.g., the range has read-only protection. The VAD tree 80 tracks both the special virtual memory that is allocated to a process, i.e., the regions that are capable of being remapped to a physical page, as well as ordinary virtual memory.

In accordance with another aspect of the present invention, to provide fast remap capability, e.g., on the order of several hundred-thousand remaps per second on contemporary machines, the various special regions have information about those regions placed in a linked list 82. More particularly, when special virtual memory is allocated via the VirtualAlloc call, as indicated by the physical flag during the allocation request, the information about that special allocation is added by the memory manager 62 to the linked list 82. Note that a typical VAD tree 80 may contain hundreds or thousands of entries, and thus walking the VAD tree 80 of the process to verify each remap is ordinarily relatively slow.

The linked list 82 is essentially a specialized subset of the VAD tree 80, (typically containing only a few entries), and thus provides the memory manager 62 with a fast verification mechanism to ensure that virtual memory specified for remapping belongs to a requesting process and is capable of being remapped, as described in more detail below. Note that it is alternatively feasible to walk the VAD tree 80 to obtain the same information, however this would typically be much slower.

Another API function, AllocateUserPhysicalPages, allocates to a process the physical memory pages that may be mapped and unmapped within any specially-allocated virtual address space region of the specified process. Note that for security reasons and to facilitate fast remapping, a given physical page cannot be simultaneously mapped by more than one virtual address at a time. For example, if two virtual addresses were mapped to the same physical location, it might be possible to free one of the mappings but not the other, leading to a situation in which a process could still see one or more pages that was later allocated to another process. The mechanism that prevents this multiple-mapping is described below. However, at present restricting multiple mapping is not deemed very significant, because it wastes generally-scarce virtual memory, as a process does not want more than one virtual address mapped to the same physical page to access the data therein.

The physical pages allocated via the above-described AllocateUserPhysicalPages function may reside at any physical address, and will almost always be physically discontiguous with respect to one another, however this is transparent to the process. The AllocateUserPhysicalPages function is described below:

---

AllocateUserPhysicalPages
WINBASEAPI
BOOL
WINAPI
   AllocateUserPhysicalPages(
      IN HANDLE hProcess,   // process within which to
                                  // allocate memory
      IN OUT PULONG_PTR NumberOfPages,  // size, in pages, of
                                    // the physical
                                    // memory to
                                    // allocate
      OUT PULONG_PTR UserPfnArray  // user address in which
                                    // to store the allocated
                                    // frame numbers
   );
Parameters
      hProcess
          Handle to a process. The function allocates memory
within the virtual address space of this process.
LockVirtualMemory privilege is required access to this
process, otherwise the function fails.
      NumberOfPages
          Specifies the size, in pages, of the physical memory to
allocate.
      UserPfnArray
          Specifies the virtual address to store the page frame
numbers of the allocated memory in.
Return Values
          If the function succeeds, the return value is TRUE.
Note that fewer pages than requested may actually be
allocated. The caller is responsible for checking the value
of NumberOfPages on return to see how many pages were
allocated. Allocated page frame numbers are sequentially
placed in the memory pointed to by the UserPfnArray
parameter.

---

-continued

If the function fails, the return value is FALSE.
GetLastError() may be used to get more information about the
failure. In this case, no frames will have been allocated.
Remarks
          The AllocateUserPhysicalPages function is used to
allocate physical memory. Memory allocated by this API
needs to be physically present in the system and is
considered locked down and unavailable to the rest of the
virtual memory management system. This API is really
allocating dedicated resources, which may be scarce.
          Note that this function does not allocate memory within
the virtual address space, but instead allocates physical
pages that are not mapped into any address space, but may be
mapped using a MapUserPhysicalPages API call, described
below.
          A program wishing to call AllocateUserPhysicalPages
needs to call AdjustTokenPrivileges to enable the
LockVirtualMemory privilege before calling
AllocateUserPhysicalPages; thus the program first needs to
have the right to enable the LockVirtualMemory privilege.

---

In accordance with another aspect of the present invention, the physical memory allocated to one process needs to be inaccessible to other processes, i.e., cross-process security is provided. One way in which cross-process security is provided is via a mechanism in the memory manager 62 that prevents any process from mapping to physical pages other than those allocated thereto in the above-described AllocateUserPhysicalPages API call. To this end, whenever physical pages are first allocated to a process, the memory manager 62 associates a process-specific bitmap 84 with that process, i.e., each process that requests physical pages for mapping from virtual memory has its own associated bitmap. The memory manager 62 maintains the bitmap 84 in kernel-mode protected memory, and updates it as physical memory is allocated to the associated process (e.g., by a further call to AllocateUserPhysicalPages) or deallocated thereby.

The bitmap 84 describes each page of physical memory in the system with respect to whether it is allocated to its associated process $60^1$, e.g., there is one bit for each page in the system, which is set to one if allocated to the process, or zero if not. The size of the bitmap may vary with the actual amount of physical memory 66 in the system. For example, if a system includes sixty-four gigabytes of memory with four-kilobyte pages, the bitmap 84 is two megabytes in size, as 64 GB/4 KB/8 bits/Byte=2 MB. If less physical memory is available, the bitmap may shrink accordingly. When a process (e.g., $60^1$) wishes to map to a specified page, (as described below), the bitmap 84 provides a rapid way in which the memory manager 62 can determine if its associated process $60^1$ is allowed access to the specified page.

In keeping with the present invention, the process is able to map or remap its specially-allocated virtual memory to the physical memory allocated thereto in a fast manner. Moreover, the remap is verified by the memory manager 62, and as described below, is maintained in a coherent manner in a multiprocessor system. More particularly, unmapping occurs in the translation buffers of each processor on which the process can run, since each processor may possibly be caching the mapping information in its translation buffer, and for security purposes, each such mapping needs to be unmapped. The mapping/remap API, MapUserPhysicalPages, is described below:

```
MapUserPhysicalPages
WINBASEAPI
BOOL
WINAPI
    MapUserPhysicalPages(
        IN PVOID lpAddress,        // virtual address within a
                                   // special memory region to map
        IN ULONG_PTR NumberOfPages,  // size, in pages, of the
                                     // physical memory array
        IN PULONG_PTR UserPfnArray   // array of page frame
                                     // numbers to be mapped in
    );
Parameters
    lpAddress
        Pointer to the starting address of the region of memory
to remap. The value of lpAddress must be the within the
address range returned by the AllocateVirtualMemory function
when the special region was allocated.
    NumberOfPages
        Specifies the size, in pages, of the physical memory
(and virtual address space) to establish translations for.
The virtual address range is contiguous starting at
lpAddress; the physical frames may be discontiguous and are
specified by the UserPfnArray.
    UserPfnArray
        Specifies the address of an array of physical page
frame numbers. These frames will be mapped by the argument
lpAddress upon return from this API. Specifying NULL for
this parameter results in the specified address range being
unmapped.
Return Values
        If the function succeeds, the return value is TRUE.
If the function fails, the return value is FALSE.
GetLastError() may be used to get more information about the
failure. In this case, no (partial or otherwise) mapping
will have been done.
Remarks
        This function maintains hardware translation buffer
coherence across all processors so upon return from this
API, all threads on all processors are guaranteed to see the
correct mapping.
```

In the memory manager 62, certain mechanisms perform verifications to ensure that the virtual memory can be mapped to the physical memory in accordance with the cross-process security requirements and other rules. Thus, as described above, on each remap request, the specified virtual memory location is checked against the linked list 82 to ensure that any locations to be remapped in the call belong to the process, the bitmap 84 is checked to ensure that the physical memory specified in the array has been allocated to the process, and the array is also checked to make sure that a physical location is not listed in the array more than once. Note that if a physical location is listed in the array more than once, multiple virtual addresses would point at the same physical page, which is not allowed; the API returns a failure in this case.

In addition to the above checks, the memory manager 62 also ensures that the specified virtual memory location is aligned on a virtual page boundary (e.g., on a four-kilobyte multiple by dropping any byte offset in the last twelve bits), and invalidates any mapping to physical page to which a virtual address in the specified region is already mapped. This ensures that a virtual page is at most mapped to one page at a time. To this end, and in accordance with one aspect of the present invention, the memory manager 62 may check the virtual address-to-physical page mapping table 70. This table 70 maintains information on which virtual memory addresses are currently mapped to which physical pages, and is updated on each mapping (remap) call. For each virtual address in a region that is mapped to a page, if that virtual address is already mapped to a page, the existing mapping entry is removed (or otherwise invalidated) from the table 70 and from any translation buffer of a microprocessor where the mapping may be cached.

Moreover, before a virtual location may be mapped to a physical page, a check is made to determine whether the newly-requested page is already mapped by this process at some other virtual address. To this end, the PFN database 72, which maintains physical page information including whether a page is actively being pointed to, is accessed, and this information checked. If the physical page is already mapped, the remap request is failed, since the process already has a virtual address mapped to this page. Note that instead of failing the call in which mapping is requested to a page that already has a virtual address mapped thereto, an alternative is to invalidate the existing mapping, e.g., by finding an entry for it in the virtual address-to-physical page mapping table 70. However, this would slow down a remap operation, and is not of much value since a process should know not to have multiple virtual addresses point to the same physical page, as this provides no real benefit. Further, note that it is also possible to double-check whether the requested physical page is marked as being one that is special (i.e., capable of being remapped to) as indicated in the PFN database 72, although the bitmap 84 should also cause an improperly mapped call to fail since the relevant bit cannot be set in the bitmap 84 without also being marked as special in the PFN database 72.

Figure 5:
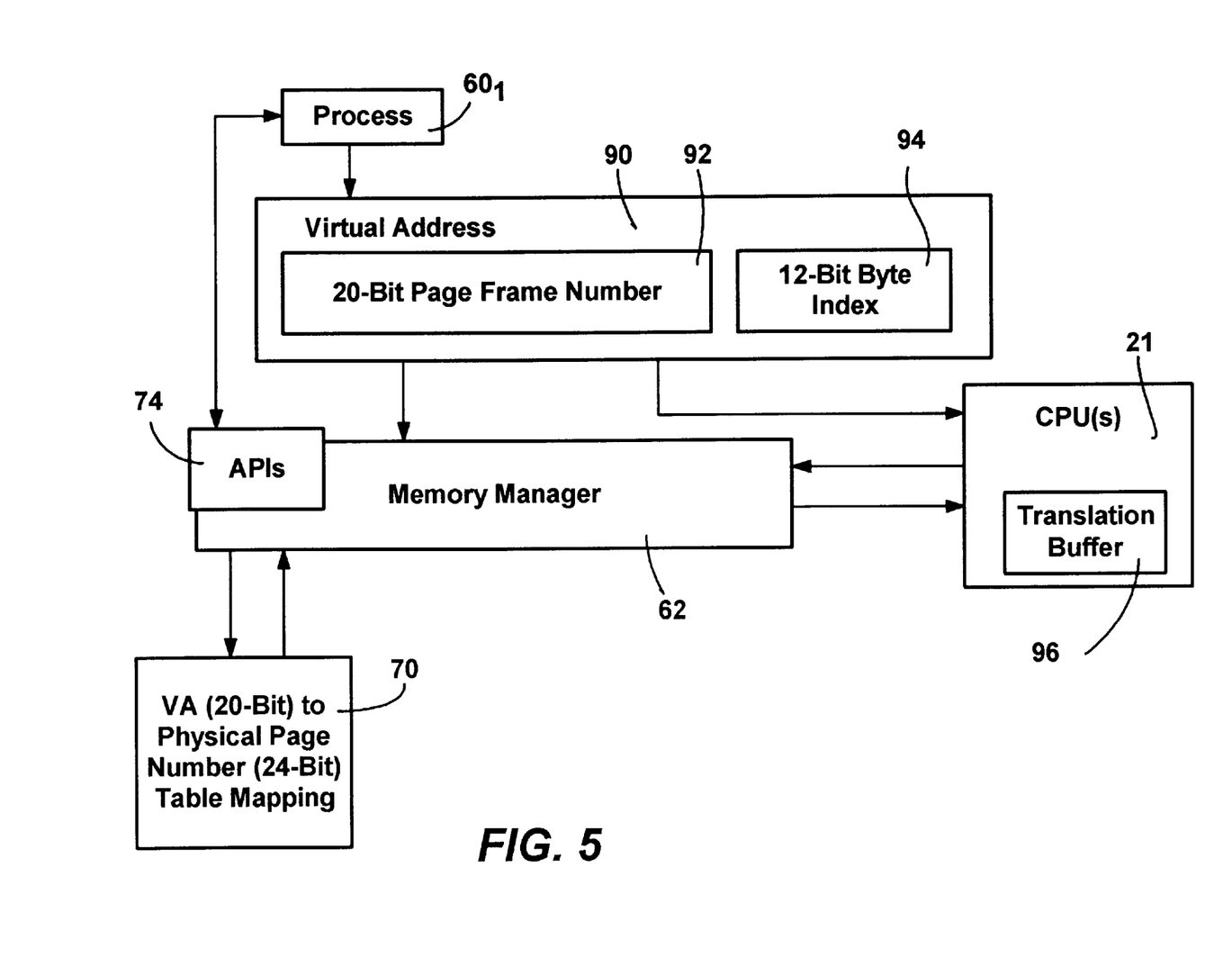
FIG. 5 is a block diagram generally representing the mapping of virtual memory to physical memory in accordance with an aspect of the present invention.

In order to facilitate mapping, rather than allow addresses in only one contiguous region of virtual memory to be remapped per API call, another API call, MapUserPhysicalPagesScatter, provides a function that allows addresses in discontiguous regions of specially allocated virtual memory to be mapped to physical memory pages. Any number of physical memory pages may be specified in this call. Any existing address maps are automatically overwritten with the new translations, i.e., the old translations are unmapped, but the physical pages are not freed. Note that unmapping occurs on each processor on which the process can run, since each processor maintains a translation buffer possibly including the mapping information, and for security purposes, each such mapping needs to be unmapped. Specifying NULL as the physical memory page array parameter causes the specified virtual address range to be unmapped, however, any currently mapped pages at those addresses will not be freed, but only unmapped. The MapUserPhysicalPagesScatter function is described below:

There is also provided an API function to explicitly free (and not just unmap) physical pages, the FreeUserPhysicalPages function. If any of these pages are currently mapped in the AWE address space, they are automatically unmapped by this call. This also unmaps mappings which may be cached by any other processors in a multiprocessor system. Note this does not affect the virtual address space consumed by the specified specially-allocated virtual region. The FreeUserPhysicalPages function is described below:

Once a valid mapping is present, FIG. 5 generally represents how a process can access a mapped-to location in the physical memory 64 using a thirty-two bit (specially allocated) virtual address, and the physical page pointer information previously provided in the remap call. As is known, a thirty-two bit virtual address includes a byte index 90. In a "narrow" (four-gigabyte maximum addressable) mode, with x86 processors the thirty-two bit virtual address is arranged as a ten-bit page directory index, a ten-bit page table index, followed by the twelve-bit byte index. Other processors such as Alpha with larger pages have no hardware-mandated virtual address format, and instead let the operating system and the PAL code define the virtual address format. On the 32-bit Alpha version of Windows 2000, software defines the virtual address as being eight bits for the page directory index, eleven for the page table index and thirteen bits for the byte index. The CPU uses a translation buffer which is maintained by the memory manager, who in turn manages this by using a set of mapping tables to determine the physical address from these indexes in the virtual address.

In keeping with the present invention, to provide access to up to sixty-four gigabytes, the CPU 21 is booted up in a "wide" mode, with a twenty-four bit frame number and a twelve bit byte offset into the frame number. For purposes of simplicity herein, the present invention will be described with respect to an x86 processor with four-kilobyte pages, unless otherwise noted. When given a thirty-two bit virtual address 92 in wide mode, the CPU 21 directly looks for the mapped-to page number in its translation buffer 94, (e.g., the physical page number shifted left twelve bits when using four-kilobyte pages) and if found, adds it to the byte offset to locate the exact byte in the page. The translation buffer 94 is essentially a rapidly-accessible cache of the CPU 21. In the event that the physical page translation information is not in the CPU's translation buffer 94, the CPU 21 generates a fault to the memory manager 62. Via processor instructions, if the virtual address is in a specially allocated region, the memory manager 62 adds the mapping information to the translation buffer 94. To this end, the memory manager locates the twenty-four bit physical page frame number based on the upper twenty bits of the virtual address and the mapping information maintained in the virtual address-to-physical address mapping table 70, i.e., to determine the physical page to which the virtual address is mapped, the byte index portion is not used by the memory manager 62. As is understood, shifting the twenty-four bit physical page number left twelve bits provides the upper twenty-four bits of the thirty-six bit (up to 64 GB) address. As can be appreciated, this moves the pointer to the correct physical page, from which the byte index determines the exact byte on that page. Note that in cases where an application accesses invalid memory, the given virtual address will not (and should not be) mapped to a physical address, and instead an access violation is generated.

Figure 6:
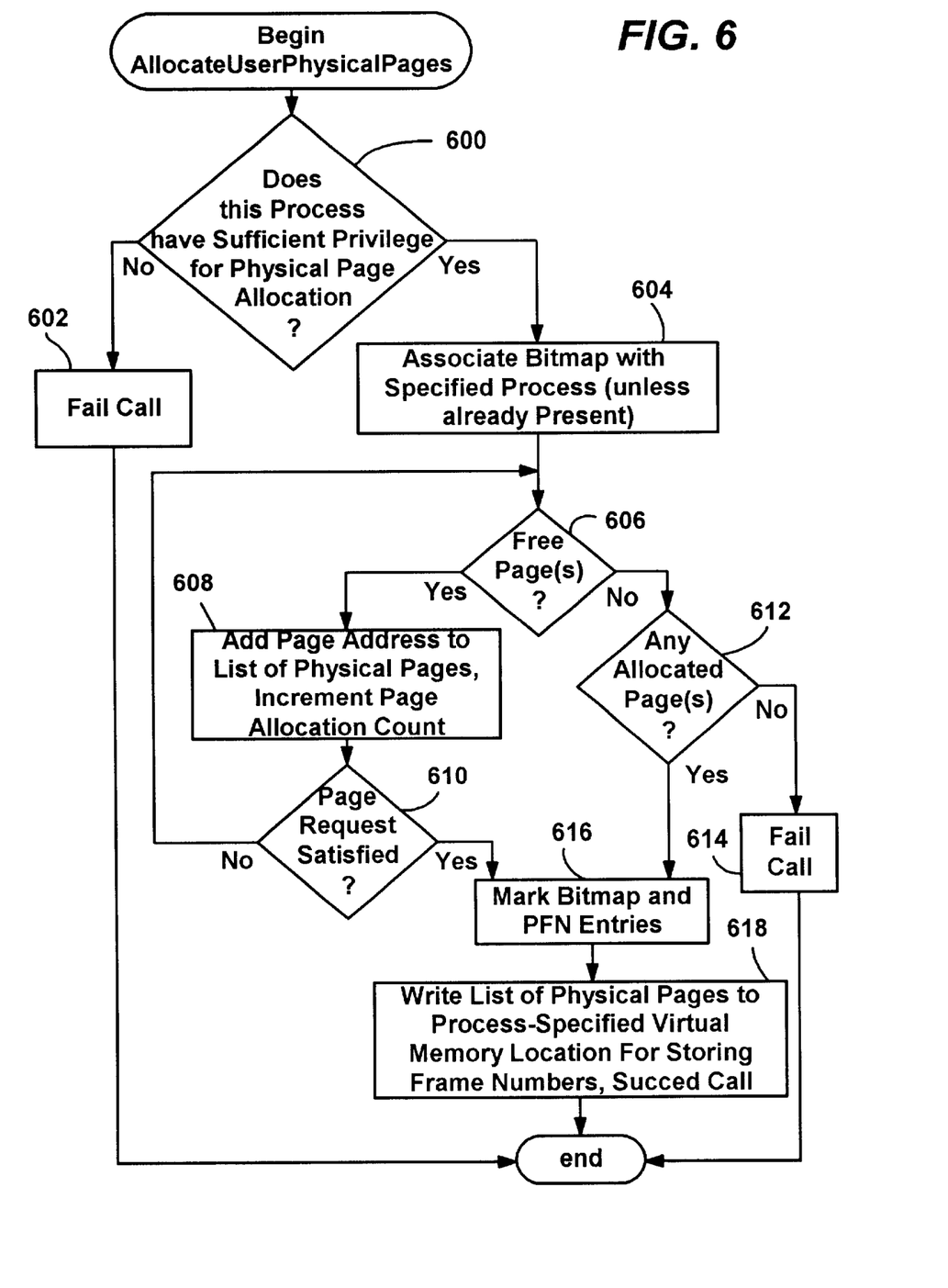
FIG. 6 is a flow diagram generally representing exemplary steps taken by the memory manager to allocate physical memory to a process in accordance with an aspect of the present invention.
Figure 7A:
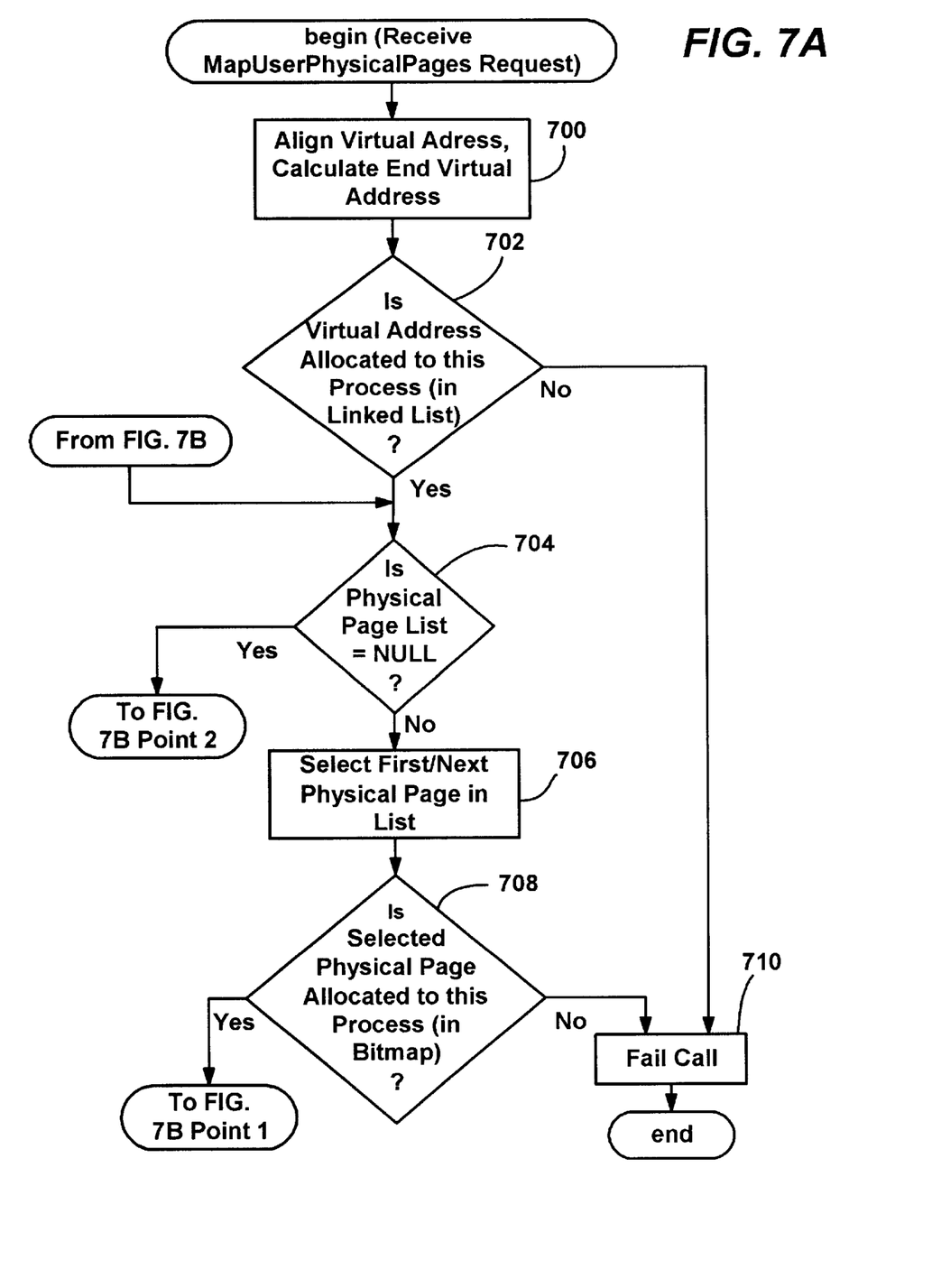
FIGS. 7A–7B comprise a block diagram generally representing exemplary steps taken by the memory manager to map and remap virtual memory to physical memory in accordance with an aspect of the present invention.
Figure 7B:
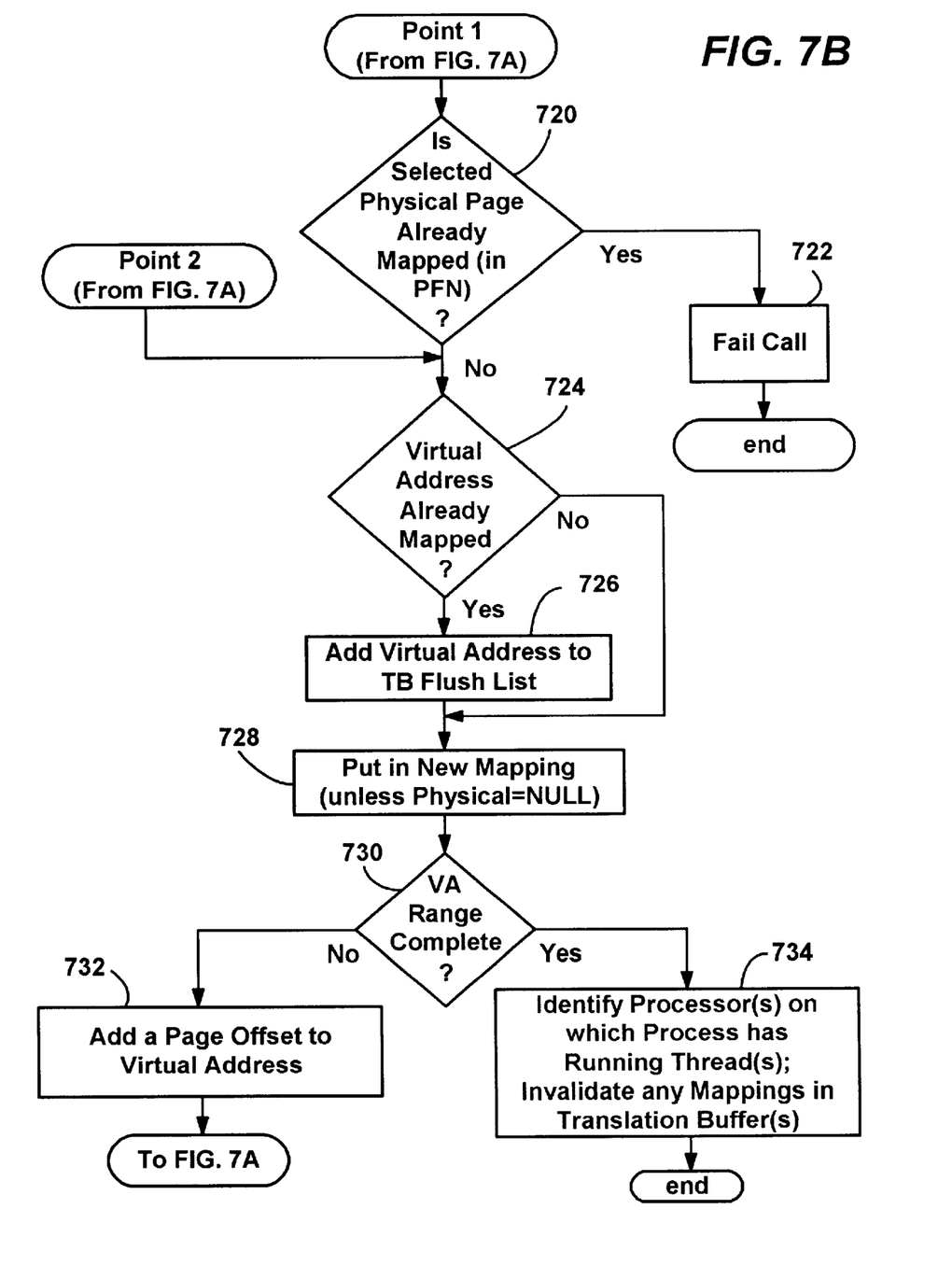

Turning to an explanation of the operation of the present invention with particular reference to FIGS. 6 and 7A–7B, representative steps in accordance with the present invention will be generally described. In general, a process will request allocation of virtual memory once, request allocation of physical pages once, and thereafter map and remap the virtual pages to physical pages as needed. For example, a database application may use the large physical memory as a cache of all (or most of) a record set, and adjust the mappings (pointers) to the physical memory as needed to rapidly satisfy informational queries for records in the set. The application can, for example, determine how it can best adjust these pointers, (e.g., via a most recently used and/or most frequently used algorithm).

As described above, allocation of virtual memory specially marked for remapping is performed by a relatively straightforward API call, and is thus not described hereinafter except to reiterate that for such allocations, the memory manager makes an entry in the physical VAD linked list 82 associated with the process. Moreover, it is noted that the process that makes the call for virtual memory need not be the process that gets associated with that virtual memory, i.e., a different process may be specified in the call.

FIG. 6 represents general steps taken to handle a request to allocate physical pages, beginning at step 600, which represents tests performed to determine whether the process has sufficient privilege for physical page allocation. The call fails at step 602 if the process does not have the correct privilege. Although not shown in FIG. 6, this allocation request call may also be failed based on other tests, such as if the process is requesting more pages of physical memory than are installed in the system, or if the specified virtual memory (for the array) does not belong to this process.

If the initial test or tests are passed, step 604 is executed. Step 604 represents the associating of the bitmap 84 with the specified process. As describe above, the bitmap 84 represents which physical pages are allocated to the specified process. Note that the bitmap 84 may already exist in association with this process if this is not the first request for allocation of physical pages thereto. The process to which physical pages will be allocated may be the calling process, by default, or may be another process if specifically identified. At step 606, if the system has a free page that it can allocate, (e.g., as tracked in the PFN database 72 of physical page information, and preferably starting from the top of memory going down to preserve low pages for 32/24-bit device drivers), the page is added to a list of pages for allocation to the process, and a count of the allocated pages increased via step 608.

Step 610 then determines based on the count whether the number of physical pages for which allocation was requested has been satisfied. If so, the process branches to step 616 to mark the bits in the bitmap 84 that correspond to the page numbers, and also mark the PFN entries for these pages in the PFN database 72 to reflect their pointed-to and allocated status. Step 618 then writes the list of physical pages to the array location specified in the call. Thereafter, the process ends successfully, returning the count to the requesting procedure in the page count parameter. Note that if something goes wrong when communicating the pages back to the user, then the entire system service is rolled back.

If instead at step 610 the number of requested pages has not yet been allocated, step 610 loops back to step 606 to attempt to find another page to allocate. Steps 606–610 will thus repeat until the page request is fully satisfied or the system runs out of pages that it can allocate. If no free pages can be found, then step 608 branches to step 612, wherein the list is checked to determine if at least one page (or some other number, such as a threshold number or percentage of pages) has been met. If not, e.g., not a single pages was allocated, step 614 may branch to step 616 to fail the call. Alternatively, the bitmap 84 may remain as is, a NULL may be written into the array at step 618, and/or a zero returned in the page count to the requesting process. If there are physical page numbers to return, step 616 marks the appropriate bits in the bitmap 84 accordingly, and then step 618 writes the list of physical pages to the array location specified in the call. The process then ends successfully, returning the count to the requesting procedure in the page count parameter. The caller is responsible for checking the NumberOfPages returned to determine how many pages were actually allocated, which may be less than the requested amount. Note that if less than a full amount of pages is to be returned, the allocation process may first perform one or more retries (e.g., from the top of the memory down), to take advantage of a possible situation wherein additional pages became free while the allocation process was executing.

If at least partially successful, the process-specified array is filled with the allocated physical page frame numbers up to the returned NumberOfPages is filled in. Note that no mapping is performed by this function, which gives the application the flexibility to simply request the address space for possible later use.

FIGS. 7A–7B generally represent steps taken by the memory manager to initially map and later remap virtual memory to physical memory pages, in response to the MapUserPhysicalPages call. As described above, the process passes a virtual address, a page count (or a pointer to a location storing the page count) and a corresponding number of physical page frame numbers (i.e., a pointer to an array thereof) with this call. At step 700, the process-specified virtual address is aligned on a page border, (e.g., by dropping any byte offset), and an end address is calculated based on the page count. Note that although not shown, the end address may be used for certain tests, such as to ensure that the range of virtual addresses does not exceed an address limit, and so forth.

At step 702, a test is performed on the virtual address range to determine if it belongs to the requesting process. As described above, this is done by walking the linked list 82 of the specially-marked pages of a process (e.g., $60^1$), rather than the VAD tree 80, primarily for speed reasons. Note that other information, such as the physical page number to which a virtual address is mapped, may also be maintained in the linked list. If, as tracked by the linked list 82, the current virtual address does not belong to this process as a special location capable of being mapped to a physical page, the call fails at step 710. Otherwise, the mapping process continues to step 704, which represents the testing of whether the array is NULL, in which event the call is asking to unmap a virtual address range and there is no physical page number. If the array is NULL, there is no physical page to verify, and the process branches to step 724 (Entry Point 2) of FIG. 7B.

If there is a physical page number identified in the specified array, step 704 branches to step 706 where the next physical page (initially the first page) is selected. Step 706 continues to step 708 to determine whether the physical page (currently selected from the list thereof) is allocated to this process, by evaluating the bitmap 84. If not allocated to this process, the call fails at step 710, otherwise the remap function continues to step 720 (Entry Point 1) of FIG. 7B to further verify that the remap request is proper. Note that step 708 is a part of the cross-process security checking.

At step 720 of FIG. 7B, the PFN database 72 is accessed for the selected physical page to determine if it is already mapped to by another virtual page. As described above, a flag in the PFN database maintains this "mapped to" state. If already mapped to, the call is failed at step 722 because having two virtual memory pages mapped to the same physical page is not allowed for security and fast remap reasons.

At step 724 of FIG. 7B, after the various security checks have been passed for the current virtual page and the current physical page (unless the list of physical pages is NULL) as described above, a test is performed to determine whether the specified virtual address is already mapped to a physical page, e.g., by checking the virtual address-to-physical page mapping table 70. If already mapped, step 726 is executed to add the mapping information (e.g., the virtual address) to a translation buffer (TB) flush list 98 (FIG. 2), which will later be used to invalidate existing mappings on the processor or processors in the system. If not already mapped, nothing is added to the flush list 98 for this page. At step 728, the new mapping is put in the virtual address-to-physical page mapping table 70, which essentially replaces any existing mapping for that virtual address in the table 70. Note that if the physical page list is NULL, there is no new mapping to add, whereby any existing mapping of the virtual address is deleted from the virtual address-to-physical page mapping table 70.

Steps 730–732 repeat the process for the entire virtual address range specified, one page at a time. When complete, the translation buffer flush list 98 may contain one or more entries therein corresponding to mappings that need to be invalidated on each CPU currently running a thread in this process. The process continues to step 734 to invalidate any such mappings via the TB flush list 98 of the appropriate processor or processors.

In keeping with the present invention, to maintain data coherency across processors, any mapping invalidations need to take place in the translation buffers for the CPUs currently running threads in this process, including this one. Note that the process has information associated therewith indicating on which processor or processors the process currently has running threads. This information is used in conjunction with the flush list 98 to invalidate the corresponding mapping information. Invalidating a list of address mappings on one or more processors is a well-known operation, and thus will not be described in detail herein.

As can be appreciated, the batching of invalidations enables the consolidated invalidation of mappings in each processor's translation buffer in a single interrupt of that processor. This maintains data coherency in a multiprocessor system, without having to interrupt the processor for every invalidated mapping. Note that without maintaining such coherency, a process with a thread running on one processor would continue to be mapped to data that may have been unmapped or freed by that process on another processor, which potentially violates cross-process security.

Although not separately described herein for purposes of simplicity, the MapUserPhysicalPagesScatter function are similar in the way that invalidations of translation buffers are batched to reduce processor interruptions. Indeed, because discontiguous (and thus possibly more) mappings may be invalidated via this call, The MapUserPhysicalPagesScatter function may further benefit from such consolidation. Similarly, the FreeUserPhysicalPages results in mappings being invalidated across processors, and thus will benefit from consolidating mapping invalidation information.

Lastly, one current implementation of the present invention includes a number of rules and/or restrictions (some of which have been described above) to ensure security and fast remap, and in part to avoid undue complexity. Exemplary rules of that particular implementation are set forth below.

For example, one such rule is that virtual address ranges allocated for as capable of being remapped are not sharable (and therefore cannot be inherited by) other processes. As described above, two different remap-capable virtual addresses within the same process are not allowed to map the same physical page. These restrictions provide fast remapping and rundown of these address spaces, which are potentially enormous. Note, however, that applications are already limited on virtual address space on 32-bit systems, and double-mapping (which would waste virtual space) is thus not particularly desirable.

Also, the physical pages that can be allocated for a remap-capable virtual region are limited by the number of physical pages present in the machine, since this memory is never paged—it is locked down until the application explicitly frees it or exits. Sufficient privilege is required at physical page allocation time to use this facility. The physical pages allocated for a given process can be mapped into any remap-capable virtual region within the same process. In this implementation, remap-capable virtual addresses are read-write and cannot be protected via calls to VirtualProtect, (i.e., no readonly memory, noaccess memory, guard pages, and so forth can be specified).

Moreover, remap-capable virtual address ranges cannot be used as a data buffer for graphics or video calls. A remap-capable memory range cannot be split or pieces of it deleted. Instead, the entire virtual address range is deleted as a unit when deletion is required. This means that the MEM¯RELEASE flag (and not the MEM¯DECOMMIT flag) needs to be specified to FreeVirtualMemory.

Lastly, as described above, a small subset of APIs are provided to operate on remap-capable virtual memory and the physical memory, such that the API subset coupled with the processor's load/store operations are sufficiently sophisticated and complete to support state-of-the-art database management systems and other memory intensive applications. Note that this implementation is supported on all platforms supported by Windows® 2000. However, applications that use the memory extension APIs are not supported in emulation mode, (i.e., an x86 application that uses the APIs will need to be recompiled to run on Alpha-32 or the 64-bit versions of Windows® 2000, whereas most applications can run without recompiling under an emulator on these platforms).

As can be seen from the foregoing detailed description, there is provided a method and system for extending the memory that an application can access. The method and system provide fast memory remap capabilities with a relatively small granularity, while providing cross-process security and multi-processor coherence.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A computer-readable medium having computer-executable instructions, comprising:
   receiving a request from a process for physical memory, and in response, allocating at least one page of physical memory thereto;
   receiving a request from the process for virtual memory, and in response, allocating virtual memory thereto;
   receiving a request from the process to map a range of virtual memory to at least one page of the physical memory; and
   determining whether the process is entitled to access each page of physical memory requested, and if so, mapping a virtual memory location in the range of virtual memory to each page of the physical memory.

2. The computer-readable medium of claim 1, wherein receiving the request from the process for physical memory includes receiving a function call.

3. The computer-readable medium of claim 1, wherein receiving the request from the process for virtual memory includes receiving a function call.

4. The computer-readable medium of claim 1, wherein receiving the request from the process to map the range of virtual memory to at least one page of the physical memory includes receiving a function call.

5. The computer-readable medium of claim 1, wherein determining whether the process is entitled to access each page of physical memory requested includes determining whether the range of virtual memory is allocated to the process.

6. The computer-readable medium of claim 5 having further computer-executable instructions, comprising, maintaining information of each virtual memory range allocated to the process.

7. The computer-readable medium of claim 6 wherein the information of each virtual memory range allocated to the process is maintained in conjunction with the allocating of virtual memory thereto.

8. The computer-readable medium of claim 7 having further computer-executable instructions comprising, deallocating virtual memory formerly allocated to the process, and wherein the information of each virtual memory range allocated to the process is maintained in conjunction with the deallocating of virtual memory therefrom.

9. The computer-readable medium of claim 6 wherein the information of each virtual memory range allocated to the process is maintained in a list associated with the process.

10. The computer-readable medium of claim 9 wherein the list comprises a subset of all the virtual memory allocated to the process, the subset identifying each virtual memory range allocated to the process that is capable of being mapped to physical memory.

11. The computer-readable medium of claim 1, wherein determining whether the process is entitled to access each page of physical memory requested includes determining whether each page of physical memory is allocated to the process.

12. The computer-readable medium of claim 11 having further computer-executable instructions, comprising, maintaining information of each page of physical memory allocated to the process.

13. The computer-readable medium of claim 12 wherein the information is maintained in a bitmap associated with the process.

14. The computer-readable medium of claim 12 wherein the information of each page of physical memory allocated to the process is maintained in conjunction with the allocating of each physical page thereto.

15. The computer-readable medium of claim 12 having further computer-executable instructions comprising, deallocating at least one page of physical memory formerly allocated to the process, and wherein the information of each page of physical memory allocated to the process is maintained in conjunction with the deallocating of each physical page therefrom.

16. The computer-readable medium of claim 1, wherein determining whether the process is entitled to access each page of physical memory requested includes determining whether each page of physical memory has a virtual memory location mapped thereto.

17. The computer-readable medium of claim 1 having further computer-executable instructions comprising, determining whether the virtual memory location is currently mapped to another physical page, and if so, invalidating the mapping.

18. The computer-readable medium of claim 17 wherein invalidating the mapping includes invalidating the mapping in a table of mappings.

19. The computer-readable medium of claim 17 wherein invalidating the mapping includes invalidating the mapping in a translation buffer of at least one processor.

20. The computer-readable medium of claim 17 wherein invalidating the mapping includes invalidating the mapping in each translation buffer of a plurality of processors.

21. The computer-readable medium of claim 17 wherein invalidating the mapping includes interrupting a processor, and invalidating the mapping and at least one other mapping in a translation buffer of the processor while the processor is interrupted.

22. The computer-readable medium of claim 21 having further computer-executable instructions comprising, interrupting at least one other processor, and invalidating the mapping and the at least one other mapping in the at least one other processor while interrupted.

23. A system for providing improved memory access to a process, comprising,
physical memory;
a memory manager, the memory manager configured to receive requests from the process, the requests including an allocation request for virtual memory, an allocation request for physical memory, and a request to map virtual memory to physical memory; and
the memory manager including at least one mechanism for determining whether the process is entitled to map the virtual memory to the physical memory, and if so, the memory manager configured to instruct a processor to map the virtual memory to the physical memory.

24. The system of claim 23 wherein the memory is configured with a set of function calls to receive the allocation request for virtual memory, the allocation request or physical memory, and the request to map virtual memory to physical memory.

25. The system of claim 23 wherein a mechanism of the memory manager for determining whether the process is entitled to map the virtual memory to the physical memory includes a data structure representing the physical memory allocated to the process.

26. The system of claim 24 wherein the data structure representing the physical memory allocated to the process comprises a bitmap.

27. The system of claim 24 wherein each bit in the bitmap represents a page of physical memory in the system.

28. The system of claim 23 wherein a mechanism of the memory manager for determining whether the process is entitled to map the virtual memory to the physical memory includes a data structure representing each set of virtual memory allocated to the process that is capable of being mapped to physical memory.

29. The system of claim 28 wherein the data structure comprises a linked list.

30. The system of claim 23 wherein a mechanism of the memory manager for determining whether the process is entitled to map the virtual memory to the physical memory includes a data structure representing whether the physical memory is already currently mapped to.

31. The system of claim 28 wherein the data structure comprises a database of information of the physical memory.

32. The system of claim 23 wherein the memory manager further includes a mechanism for invalidating an existing mapping of the virtual memory to at least one page of physical memory.

33. The system of claim 23 further comprising a data structure maintained by the memory manager for representing existing mappings from virtual memory to physical memory.

34. The system of claim 33 wherein the memory manager accesses the data structure to determine whether the virtual memory is mapped to a page of the physical memory.

35. The system of claim 34 wherein the memory manager further includes a mechanism configured to invalidate at least one existing mapping of the virtual memory to physical memory.

36. The system of claim 34 wherein the memory manager further includes a mechanism configured to invalidate at least one existing mapping of the virtual memory to physical memory on a plurality of processors on the system.

37. The system of claim 23 wherein the memory manager is further configured to deallocate virtual memory formerly allocated to the process, and to invalidate any physical memory corresponding to deallocated virtual memory.

38. In a computer system having physical memory and at least one processor, a method for accessing the physical memory, comprising:
receiving a request from a process for physical memory, and in response, allocating at least one page of physical memory thereto;
receiving a request from the process for virtual memory capable of being mapped to physical memory, and in response, allocating virtual memory thereto;
receiving a mapping request from the process to map a range of virtual memory to at least one page of the physical memory, the request including a variable corresponding to the range of virtual memory and a list of each physical page;
determining whether the process has the range of virtual memory allocated thereto, and if not, failing the mapping request; and
determining whether the process is entitled to access each page of physical memory requested, and if so, mapping a virtual memory location in the range of virtual memory to each page of the physical memory, and if not, failing the request.

39. The method of claim 38 wherein each of the requests is received via a function call.

40. The method of claim 38 wherein determining whether the process has virtual memory capable of being mapped to physical memory allocated thereto includes accessing a data structure for this process that tracks the virtual memory capable of being mapped to physical memory.

41. The method of claim 40 wherein the data structure comprises a linked list.

42. The method of claim 38 wherein determining whether the process is entitled to access each page of physical memory includes accessing a data structure that tracks the physical memory allocated to the process.

43. The method of claim 38 wherein determining whether the process is entitled to access each page of physical memory includes accessing a data structure that tracks information of the physical memory of the system, including whether physical memory has virtual memory mapped thereto.

44. The method of claim 43 wherein the virtual memory is mapped to the physical memory, and further comprising updating the data structure to indicate that the physical memory has virtual memory mapped thereto.

45. The method of claim 38 wherein determining whether the process is entitled to access each page of physical memory includes accessing a first data structure that tracks the physical memory allocated to the process, and a second data structure that tracks information of the physical memory of the system, including whether physical memory has virtual memory mapped thereto.

46. The method of claim 38 further comprising, deallocating virtual memory formerly allocated to a process, and updating a data structure that tracks the virtual memory allocated to the process to indicate the virtual memory is no longer allocated to the process.

47. The method of claim 38 further comprising, deallocating physical memory formerly allocated to a process, and updating a data structure that tracks the physical memory allocated to the process to indicate the physical memory is no longer allocated to the process.

48. The method of claim 38 further comprising, determining whether the range of virtual memory has at least one existing mapping of a location therein to another physical page, and if so, invalidating each existing mapping.

49. The method of claim 48 wherein invalidating the mapping includes invalidating the mapping in a table of mappings.

50. The method of claim 48 wherein invalidating the mapping includes invalidating the mapping in a translation buffer of the at least one processor.

51. The method of claim 48 wherein invalidating the mapping includes invalidating the mapping for at least two processors.

52. The method of claim 48 wherein a plurality of existing mappings are present, and further comprising invalidating the plurality of existing mappings on a plurality of processors by interrupting each processor, and invalidating the mappings while each processor is interrupted.

* * * * *